J. A. STEFFENS.
PROCESS OF RECOVERING GLYCERINE.
APPLICATION FILED NOV. 19, 1919.
1,423,042.
Patented July 18, 1922.
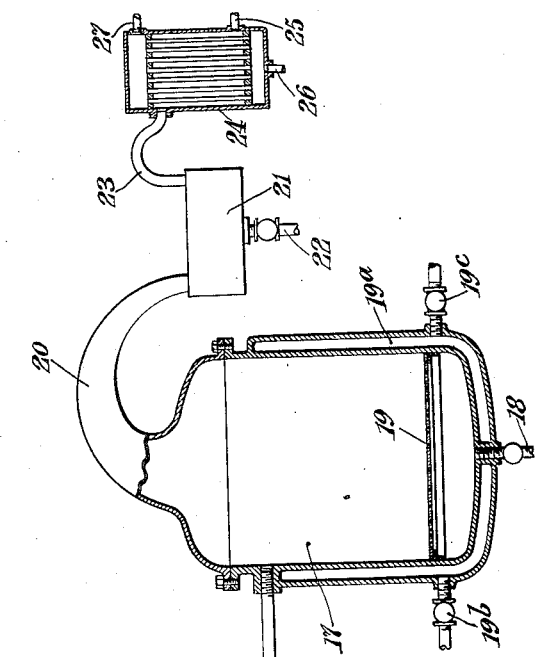
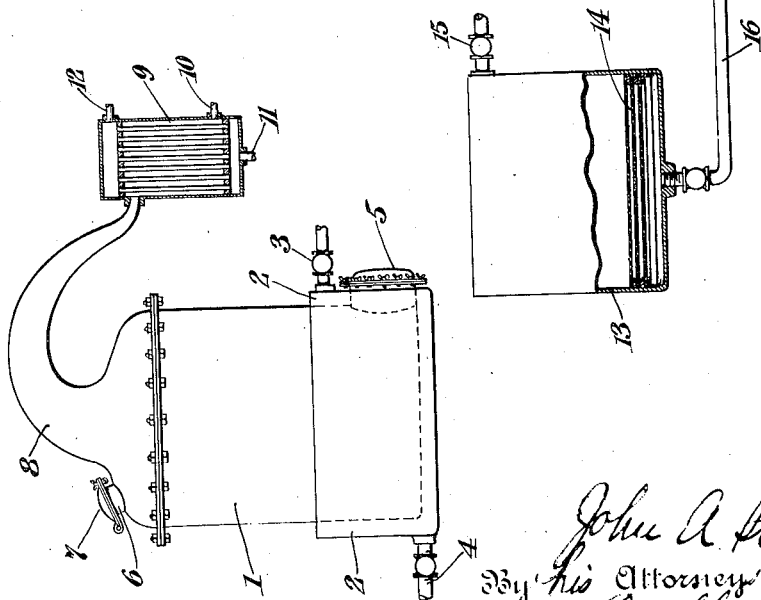
John A. Steffens, Inventor
By his Attorney
Prindle, Wright & Small.

UNITED STATES PATENT OFFICE.

JOHN A. STEFFENS, OF BALTIMORE, MARYLAND, ASSIGNOR TO U. S. INDUSTRIAL ALCOHOL CO., A CORPORATION OF WEST VIRGINIA.

PROCESS OF RECOVERING GLYCERINE.

1,423,042. Specification of Letters Patent. Patented July 18, 1922.

Application filed November 19, 1919. Serial No. 339,218.

*To all whom it may concern:*

Be it known that I, JOHN A. STEFFENS, a citizen of the United States, residing at Baltimore, in the State of Maryland, have invented a certain new and useful Improvement in Processes of Recovering Glycerine, of which the following is a specification.

My invention relates particularly to a process designed to recover glycerine from products of many different kinds, but relates especially to the recovery of glycerine from waste materials obtained in alcohol fermentation.

The object of my invention is to provide a process by means of which glycerine may be recovered from waste materials of many different kinds, but particularly from the distillery waste obtained in alcohol fermentation, as for example in the ordinary process of producing alcohol by the fermentation of materials containing a sugar, or in the alcohol fermentation process using an alkaline medium such as that set forth in the patent to Eoff upon process of manufacturing glycerol, No. 1,288,398, dated December 17th, 1918.

One of the objects of my invention is to decrease the solubility of the organic solids in the liquid, so as to effectively precipitate them.

Another object of my invention is to recover the glycerine from materials of this character by precipitating with an acid and removing a large percentage of the organic solid materials present prior to the separation of the glycerine from the remaining liquid materials.

Further objects of my invention will appear from the detailed description thereof contained hereinafter.

While my invention is capable of being carried out in many different ways, for the purpose of illustration I shall describe only one way of carrying out the same hereinafter, and while it is capable of being carried out in connection with many different types of apparatus, I have shown only one type of apparatus for use in connection therewith in the accompanying drawing, in which:

The figure is a diagrammatic representation of an apparatus which may be used in connection with my invention.

For example, my invention may be carried out in the following manner: Distillery waste or slop, as for example that obtained in the ordinary distillation process for the production of alcohol, and which may, for example, be the slop obtained from the fermentation of molasses, although it may be the slop obtained from the fermentation of any other alcohol producing material, is concentrated by evaporation in any suitable manner to a density of 25° to 40° Bé. Assuming that the density of the slop in this particular example is 33° Bé., the concentrated slop is introduced into a still 1 having a steam jacket 2 with valved steam inlet and outlet pipes 3 and 4. Said still 1 has a valved normally closed clean-out door 5 at the bottom thereof. Furthermore, at the top of the still 1, there is a charging opening 6 normally closed by a cover 7 and a vapor outlet pipe 8 which leads to a water cooled condenser 9 having a draw-off pipe 10 which condenser is cooled by a current of water supplied by inlet and outlet pipes 11 and 12. A precipitant is then added. The precipitant may be a strong mineral acid, such for example as sulphuric acid having a strength of 95%. This may be introduced into the still 1 in the proportion of 2.5 kg. of the acid to 40 liters of the slop, the amount of acid added being sufficient to neutralize approximately 60% of the ash in the slop. Among the other acids which may be used are hydrochloric acid and posphoric acid $H_3PO_4$. Instead of a mineral acid, an alkali may be used, as for example, burnt or slaked lime, or magnesia. Also instead of these substances other precipitants that may be used are ferrous sulphate, lead oxide, aluminum sulphate, lead nitrate, or lead acetate. Some of these precipitants change the chemical character of the organic materials which are less soluble in the liquid, and others carry down the precipitated materials by the physical action, as by the weight of the solid materials present. By the term precipitant herein, I mean a material which will change the character of the body of solids present in such a manner as to be less readily dissolved in or suspended by the liquid. The contents of the still are now heated to a temperature of 125° to 150° C., and the heating may, if desired, be continued until substantially all of the water has been driven off. This treatment with sulphuric acid results in precipitating as well as charring the organic solid materials present. With the water which is driven off, there is a small quantity of acetic acid which may be recovered from the condenser 9. The solid mass is then removed through the door 5 to a filter tank 13 having a screen or filter plate 14 at the bottom thereof, and provided with a valved water inlet pipe 15 at the top of the same. The materials in the filter tank 13 are rapidly leached by adding water or some other solvent, such for example as alcohol, from the pipe 15, and the liquid is then run off through a valved outlet pipe 16 to a still 17 having at the bottom thereof a valved inlet pipe 18 for live steam and a perforated steam distributing plate 19, as well as a steam jacket $19^a$ supplied with steam by means of valved inlet and outlet pipes $19^b$ and $19^c$. At the top of the still there is a vapor outlet pipe 20 communicating with an air cooled condenser 21 having a valved outlet pipe 22 for the condensed glycerine, and a vapor outlet pipe 23 leading to a condenser 24 having an outlet pipe 25 for the sweet water, said condenser 24 being cooled by a current of water passed through the same by inlet and outlet pipes 26 and 27. Materials in the still 17 are evaporated by the application of heat from the steam jacket $19^a$ until the liquid has reached a concentration of 20 to 30% glycerine. After this, the live steam is injected from the pipe 18, so as to drive off the glycerine which is collected in the air cooled condenser 21, and may be drawn off from the same by the pipe 22. The sweet water containing a very small percentage of glycerine is drawn off from the condenser 24 by the pipe 25, and may be discarded or treated for the recovery of the remaining glycerine therein, as desired.

While I have described my invention above in detail, I wish it to be understood that many changes may be made therein without departing from the spirit thereof.

I claim:

1. The process of recovering glycerine from materials subjected to alcohol fermentation comprising precipitating the organic materials with an acid, heating the mass and removing the water, and then leaching with a liquid and recovering glycerine therefrom.

2. The process of recovering glycerine from materials subjected to alcohol fermentation comprising precipitating the organic materials with sulphuric acid, heating the mass and removing the water, and then leaching and recovering glycerine from the leaching liquid.

3. The process of recovering glycerine from materials subjected to alcohol fermentation comprising precipitating the organic materials with an acid, distilling off the water, and then leaching with a liquid and recovering glycerine therefrom by distillation.

4. The process of recovering glycerine from materials subjected to alcohol fermentation comprising precipitating the organic materials with sulphuric acid, distilling off the water, and then leaching with a liquid and recovering glycerine therefrom by distillation.

5. The process of recovering glycerine from materials subjected to alcohol fermentation comprising precipitating the organic materials with sulphuric acid, heating at about 125 to 150° C. until the water is substantially driven off, and then leaching the mass and recovering glycerine therefrom.

In testimony that I claim the foregoing, I have hereunto set my hand this 6th day of November, 1918.

JOHN A. STEFFENS.